May 23, 1961 R. A. FRYKLUND 2,985,015
DEPTH INDICATING SYSTEM
Filed Nov. 10, 1955 2 Sheets-Sheet 1
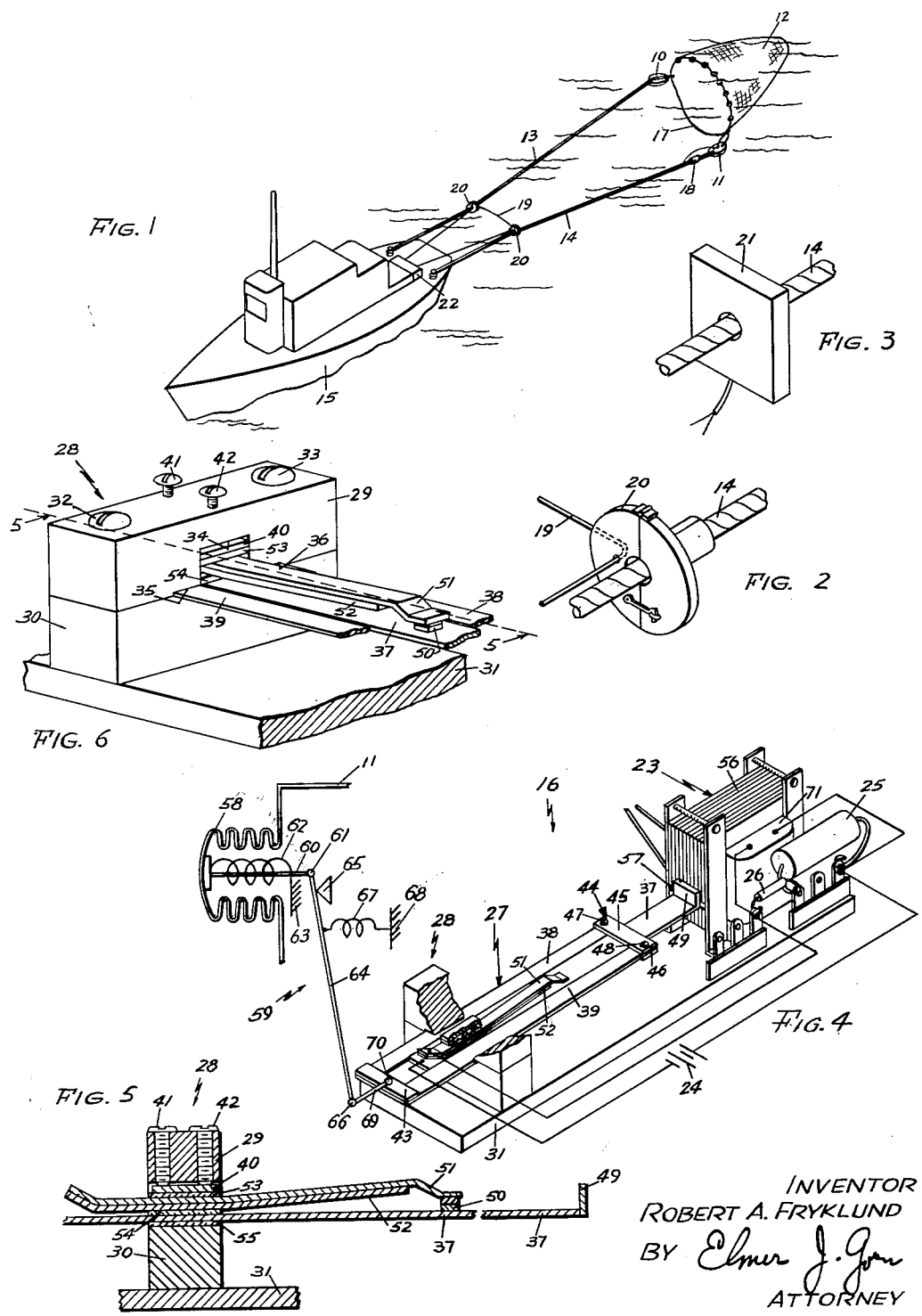
INVENTOR
ROBERT A. FRYKLUND
BY Elmer J. Gorn
ATTORNEY

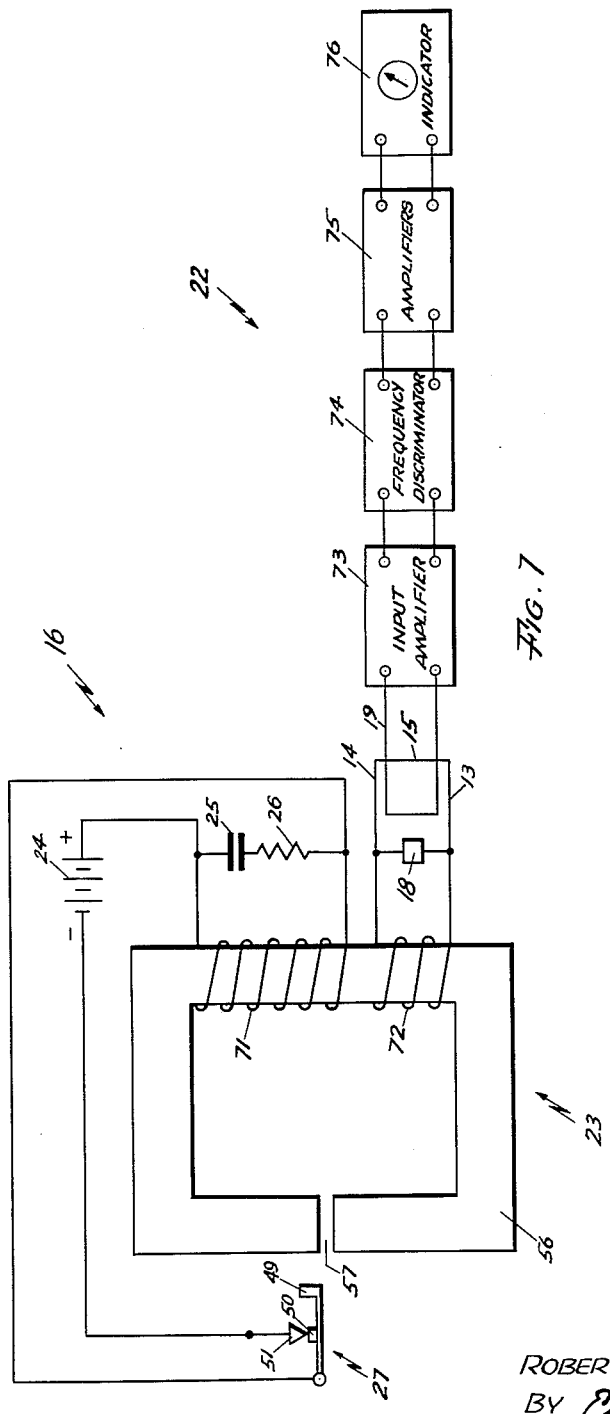

United States Patent Office 2,985,015
Patented May 23, 1961

2,985,015

DEPTH INDICATING SYSTEM

Robert A. Fryklund, Johnson City, N.Y., assignor to Raytheon Company, a corporation of Delaware Filed Nov. 10, 1955, Ser. No. 546,237

4 Claims. (Cl. 73—299)

This invention relates to underwater depth indicating systems and particularly to a system designed to indicate the depth of a device, such as a trawling device, towed by a vessel.

This invention is adaptable to many different types of vessels, surface and underwater, wherein there is a need to know the depth of a towed device. One such use of the invention is to commercial fishing wherein the towed device is a trawl. Presently, increasing numbers of surface vessels are being equipped with sonar devices to determine the depth of large bodies of fish. Sonar devices, however, are merely an aid toward improving the quantity of the "catch." Then again, those skilled in the art of fishing may merely desire to trawl at some particular depth. In both instances, there exists the need to know the depth of the trawling device so that it can be maneuvered accordingly. The depth of said trawling device is commonly dependent upon its mass, the speed of the vessel, the length of the tow cables expended, and the direction and magnitude of the flowing water medium. The invention uniquely overcomes the "guesswork" inherent in maneuvering the trawling device, where no depth indicator is employed, and at the same time eliminates the need of specially constructing tow cables, in a system wherein the tow cables may be supports for direct electrical connection between the underwater and vessel-borne components. In addition, no special handling of the tow cables is required during normal use of the trawling device.

In accordance with this invention, the difficulties before stated are overcome in the following manner.

The depth of the towed device is ascertainable by a system comprising an underwater, alternating-current generator, attached to the towed device, having its output transmitted to a vessel-borne receiver-indicator via the tow cables connecting the towed device to the vessel. The frequency of said alternating current is dependent upon the depth to which the generator is submerged; hence, the output frequency of said generator is a function of the depth of the towed device. Inductive coupling is employed to couple the signal carried by the tow cables to the receiver-indicator. Sufficient amplifier and frequency-discriminator stages comprise said receiver-indicator to ultimately drive an indicator device, whereby depth is displayed as a function of frequency. Thus, the depth of the towed device is made discernible.

The aforementioned and other objects of the invention will best be understood from the following description of exemplifications thereof, reference being had to the accompanying drawings, wherein:

Fig. 1 is an isometric view of the system of the present invention in relation to a surface vessel adapted to tow a trawling device;

Fig. 2 is an isometric view of a slider device securing an inductive coupling to the signal-carrying tow cable;

Fig. 3 is an isometric view of a current transformer used to inductively couple the signal carried by a tow cable to a receiver-indicator;

Fig. 4 is an isometric view of the electromechanical elements comprising the underwater variable-frequency generator;

Fig. 5 is a transverse sectional view of a mounting block taken alone line 5—5 of Fig. 6;

Fig. 6 is an isometric view of a mounting block showing the elements supported and secured therein; and Fig. 7 is a partially block and a partially schematic diagram of the electrical components.

In Fig. 1, two water-tight housings 10 and 11 are secured to a towed device 12, close to its mouth. These housings are towed along with the towed device, for example a fishing net or trawl, by two cables 13 and 14 from a vessel 15. One of the housings 10 or 11, contains a variable-frequency generator 16 (see Fig. 4); the second housing is merely a hydrodynamic counterbalance. A head cable 17 is a portion of the two cables to which the trawl is secured.

The output of the variable frequency generator 16 is coupled to the cables 13 and 14 across an insulator 18. An inductive coupling device, for example, a pickup loop 19 secured in two sliders 20, or a current transformer 21, couples the signal from the tow cables to a receiver-indicator 22 carried on the vessel 15. In Fig. 2 there is shown the manner in which the tow cables are routed through the sliders which are also towed by the vessel. In this manner, water pressure exerted upon the face of the sliders keeps the pickup loop 19 in close proximity to the tow cables for inductive coupling. In Fig. 3, the alternate coupling, the current transformer 21 is shown. The current transformer is mounted conveniently on the deck of the vessel and one of the tow cables 13 or 14 runs through its air core. The induced current in the current transformer 21 is coupled to the receiver-indicator 22.

In Fig. 4, the electromechanical elements of the variable-frequency generator 16 are shown in the housing 11. The pure electrical elements are an iron-core transformer 23, a voltage source 24, a capacitor 25, and a resistor 26. These elements and a multiple-reed device 27 are included in a closed electrical circuit.

The multiple-reed device is comprised of vibrating members and a mounting block 28 therefor. As shown in Figs. 4, 5 and 6, the mounting block may be comprised of two metal sections 29 and 30, with the section 30 permanently secured to a mounting plate 31 by two screws 32 and 33 securing the section 29 to the top surface of the section 30. The mating portion of the section 29 is suitably machined so that the center 34 and the areas 35 and 36 immediately adjacent to the center are grooved. Said center groove 34 is cut deeper than each of the equal depths to which the adjacent grooves 35 and 36 are cut.

There are three vibrating members 37, 38 and 39, each of which is made of thin, resilient, elongated metal strips. One strip, constituting a center reed 37, is secured in place adjacent one end in the center groove 34 of the mounting block 28. Said center reed is held in place by pressure exerted on a plate 40 in the center groove by screws 41 and 42 in the section 29 of the mounting block 28. Two strips, constituting side reeds 38 and 39 are slideably supported in said mounting block in the other of said grooves 35 and 36 and are connected by a crossbar 43 beyond the shorter protruding portion of the center reed. The longer portion of the protruding center reed 37 is included within, but the two ends of the side reeds 38 and 39 are secured by, a bridging member 44 which perpendicularly spans and bears on said center reed. Said bridging member 44 is comprised of two halves 45 and 46 of heavier stock metal because its mass is important in determining the vibrating frequency of the reed device. Both halves 45 and 46 of said bridging member 44 are secured to the ends of the side reeds 37 and 38 by screws and nuts 47 and 48 so that the bridging member and side reeds can slide over the protruding surface of the center reed. A magnetizable head 49 is secured to the end and on the broadest dimension of the center reed 37. A contact 50 may be mounted on the center reed at a point where it normally mates with another contact 51 (see Fig. 5).

As shown in Fig. 5, the contact 51 and a damper 52 therefor are secured along with center reed 37 in the center groove 34 spaced by insulators 53, 54 and 55 therebetween. The contact 51 mates with the contact 50 when the reeds are at rest.

The dimensions, mass and resiliency of members comprising the multiple-reed device, the point at which center reed is fixed in the mounting, and the distance that the other members of the reed device can be moved may be suitably selected so that these mechanical elements will interrupt the closed circuit at a rate which will produce a range of frequencies between 20 and 30 cycles per second.

Referring again to Fig. 4 and also to Fig. 7, the iron core transformer 23 is secured to the mounting plate 31 in a position compatible with the magnetizable head 49 of the center reed. Said transformer 23 has a laminated iron core 56, separated by an air gap 57 which is perpendicular to the plane of the laminations of said iron core. The selection of the transformer 23 is based upon its having a low-impedance, secondary winding required for impedance-matching purposes. Factors influencing the selection are discussed with the detailed theory presented in connection with the operation of the variable-frequency generator.

Center reed 37 is positioned with its broadest dimension substantially parallel to the length of the air gap 57 with the magnetizable head 49 off-centered and substantially in the field of the iron core 56. In this position, contacts 50 and 51 mate as shown in Fig. 5.

Again referring to Fig. 4, a bellows 58 is sensitive to changes in water pressure. It is suitably attached to the housing 10 or 11 containing the variable-frequency generator so that it can sense water pressure at the depth of the housing. When acted upon, the compression of the bellows exerts a force on a spring-biased linkage system 59, the opposite end of which is tied to the crossbar 43 of the multiple-reed device 27. As a result, the portion of the multiple-reed device composed of side reeds 38 and 39, and bridging member 44 slides away from the head 49. The portion of the spring-biased system acted upon by the force exerted on the bellows is a pivoted lever 60, between the head of the bellows 58 and tie point 61. An expansion spring 62, fixed at one end at a point 63 and attached at the other end to the bellows, exerts a force on the pressure-sensitive portion of said bellows to keep same in its normal position. The external force exerted on tie point 61 unbalances the normal position of a lever 64 on a fulcrum 65 between tie point 61 and another tie point 66. The lever 64 is normally held in contact with the fulcrum 65 by a tension spring 67 between said lever 64 and a fixed point 68. The multiple-reed device 27, connected to the linkage system by a lever 69 between the tie point 66 and another tie point 70, moves as hereinbefore stated in response to the unbalance created.

The distance moved by the portion of the reed device 27 when the bellows is acted upon is proportional to the force exerted; stated in another manner, the effective mass of the multiple-reed device moves to a point on the center reed that makes the number of vibrations per second of all the reeds a function of the force exerted.

In Figs. 6 and 7, a capacitor 25 and a resistor 26 are connected in series across a primary winding 71 of transformer 23. These elements may be used in this manner to eliminate arcing between contacts 50 and 51. The output leads of a secondary winding 72 of the same transformer may be suitably coupled across the insulator 18 to connect the output of the variable-frequency generator to the tow-cable transmission line comprising the head-rope cable 17, the tow cable 13, the vessel 15, and tow cable 14. Said vessel 15 may be considered as a common return path for the alternating current in the tow-cable transmission line.

The variable-frequency generator 16 is shown in Fig. 7. Basically, the variable-frequency generator may be described as an interrupted closed electrical circuit with pressure-sensitive mechanical elements controlling the rate at which the interruption occurs.

Assuming for the purpose of explanation, that the vibrating reeds are stationary, current flows from the positive side of the source 24, through the primary winding 71, through the multiple-reed device, contacts 50 and 51, and back to the negative side of the voltage source. One complete vibrating cycle of the multiple-reed device takes place in the following way: Current flowing through the primary winding 71 of transformer 23 causes iron core 56 to become magnetized. Lines of force flow across the air gap 57 between the core. Said air gap 57 offers a larger reluctance to the lines of force than an electrical conducting body, such as a magnetizable metal. The magnetizable head 49 of center reed 37, in its off-center position above the air gap, offers a path of less reluctance to the lines of force between the segments of the iron core 56. Hence, the magnetizable head becomes the conducting medium for lines of force between segments of the iron core. Since the center reed to which the head is attached is secured in a plane substantially parallel to the air gap, the head can only be forced downward to provide a path of least reluctance for both segments. Normally, closed contacts 50 and 51 are arranged to open when the magnetizable head 49 moves downward. The opening of the contacts interrupts the closed electrical circuit causing the lines of force to collapse and the head 49 rises to its at-rest position as the force exerted on it dissipates. Another cycle of vibration repeats in the same manner, except that once the center reed overcomes the force of inertia and builds up sufficient momentum vibrations occur over much of the lengths of the side and center reeds of the reed device 27. These vibrations extend over the lengths of the reeds to the portions secured in the mounting block 28.

The number of vibrations per second executed by the vibrating reeds is dependent upon the position of the bridging member 44 of the reed device. Under operating conditions, the position of the bridging member may be controlled by the water pressure exerted on the bellows 58 as hereinbefore stated.

A step-down secondary winding is used for impedance matching purposes; a suitable output impedance being required to match the characteristic impedance of the tow-cable transmission line for maximum signal coupling from the generator to the tow cables. To all intents and purposes, the tow-cable transmission line in salt water, a highly conductive medium, can be represented by a very low impedance comprised of small shunt and larger series impedances. The small shunt impedances are dependent upon the inherent characteristics of the salt water medium and the distance between the two cables. The series impedances are dependent upon the characteristics of the metal tow cables. Both shunt and series impedances are affected by the length of the tow cables comprising the transmission line.

A matching problem is present in order to couple maximum signal from the tow cables to the receiving-indicator 22. Once again, a low-input impedance is desirable in order to match the output impedance of the variable-frequency generator and the tow-cable transmission line. Thus, the terminating impedance of the inductive coupling used, pickup loop 19 or the current transformer 21, is also a very small value. Another advantage of the invention may be mentioned at this point after the description of the aforesaid impedance-matching problems. The use of an alternating current at a variable frequency for intelligence purposes is better suited to this kind of system employing two-cable transmission lines than any direct-current system wherein only a variation in amplitude can be used to carry intelligence. The basis for this statement is evident from a consideration of the shunt impedances inherent in an invention, such as herein described, wherein use is made of the tow cables as transmission lines. In comparison between any direct-current system and a variable-frequency, alternating-current system, all other factors being equal, i.e. temperature of the water medium, its salinity, length of cables extended, etc., amplitude variations as a means for conveying intelligence will be subject to the variation of shunt impedances as the distance between the tow cables changes. The result of changing shunt impedances precludes the use of amplitude as the intelligence of the system.

The alternating-current signal coupled to the receiver indicator 22 will be of small magnitude for reasons hereinbefore stated. An input amplifier 73 will be required to provide a usable level for a subsequent frequency-discriminator stage 74. The output of the latter stage may require further amplification by other stages 75 in order to drive a suitable indicating device 76 graduated to indicate depth as a function of frequency.

The invention is not limited to the particular details of construction, materials used, or to the electrically conducting tow cables in water media as described above, as many equivalents will suggest themselves to those skilled in the art. It is desired that the claims that follow be given broad interpretation commensurate with the scope of the invention within the art.

What is claimed is:

1. A pressure-responsive signal generator comprising an inductive device; a mounting block; a first vibrating member fixed adjacent one end in the center of said mounting block; second and third vibrating members slidably supported on adjacent sides of said first vibrating member in said mounting block; a crossbar connecting respective ends of said second and third vibrating members at one side of said mounting block; a weighted bridging member connecting the other ends of said second and third vibrating members at the other side of said mounting block and bridging the free end of said first vibrating member; said inductive device and said vibrating member being included in a closed electric circuit for energizing said inductive device to generate an electromagnetic field; said first vibrating member being located within said electromagnetic field of said inductive device and responsive thereto for vibrating said members, thereby opening and closing said field-generating circuit; and pressure-responsive means connected to said second and third vibrating members to slide the same along said first vibrating member to control the rate of vibration of said vibrating members, whereby an alternating current, having frequency as a function of the distance said slidable members are moved on said first vibrating member, is generated in said inductive device.

2. A pressure-responsive signal generator comprising an inductive device; a vibrating element; said inductive device and said vibrating element being included in a closed electric circuit, said inductive device being energized in said closed circuit to generate an electromagnetic field and said vibrating element being located within said electromagnetic field and vibrated therein for alternately opening and closing said closed circuit; means for controlling the vibrating rate of said vibrating element; and pressure-responsive means comprising a bellows and a linkage system connected to said bellows at one end thereof and to said rate-controlling means at the other end thereof; said linkage system sliding said rate-controlling means on said vibrating element a distance proportional to the pressure exerted on said bellows, whereby an alternating current, having a frequency as a function of the distance moved by said rate-controlling means on said vibrating element, is generated in said inductive device.

3. A pressure-responsive signal generator comprising a transformer; a vibrating element; said transformer comprising a primary winding and a low-impedance secondary winding; an iron core upon which said windings are wound and an air gap separating said iron core into segments; said primary winding and said vibrating element being included in a closed electric circuit, said primary winding being energized in said closed circuit to generate an electromagnetic field and said vibrating element being located within the electromagnetic field of a segment of said iron core and vibrated therein for alternately opening and closing said closed circuit; means for controlling the vibrating rate of said vibrating element; and pressure-responsive means connected to said rate-controlling means whereby an alternating current, having frequency as a function of pressure upon said pressure-responsive means, is generated in said low-impedance secondary winding.

4. A depth indicating system for indicating the depth of a device towed by a vessel comprising a pair of spaced electrically conductive tow cables attached to said towed device, a pair of water-tight housings, said housings being secured to said towed device at spaced locations whereby said device is hydrodynamically balanced, a variable frequency generator situated in one of said housings, said generator including transformer means having a primary connected to a current source for generating an electromagnetic field, vibrating means located within said field to provide an alternating output signal at the secondary of said transformer means, pressure responsive means coupled to said vibrating means for controlling the vibration of said vibrator means to cause the frequency of said output signal to vary as a function of depth, means for coupling said output signal of said generator to said two cables for transmission to said vessel, a receiver for indicating depth on said vessel, said receiver including frequency discrimination means, and means for electrically coupling said receiver to said cables to cause said receiver to be responsive to said output signal.

References Cited in the file of this patent

UNITED STATES PATENTS

| | | |
|---|---|---|
| 1,255,034 | Mason | Jan. 29, 1918 |
| 2,225,668 | Subkow et al. | Dec. 24, 1940 |
| 2,429,094 | Kent | Oct. 14, 1947 |
| 2,448,298 | De Fligue | Aug. 31, 1948 |
| 2,689,425 | De Veen | Sept. 21, 1954 |
| 2,729,910 | Fryklund | Jan. 10, 1956 |

FOREIGN PATENTS

| | | |
|---|---|---|
| 525,015 | Belgium | Dec. 31, 1953 |